INVENTORS
JOHN LESTER DENLINGER
THOMAS E. SMITH
BY
Stephen L. Husting
ATTORNEY

INVENTORS
JOHN LESTER DENLINGER
THOMAS E. SMITH

BY *Stephen S. Kosting*

ATTORNEY

INVENTORS
JOHN LESTER DENLINGER
THOMAS E. SMITH

BY Stephen L. Hunting
ATTORNEY

May 9, 1967 J. L. DENLINGER ETAL 3,318,137
ROTARY INSPECTION APPARATUS
Filed Feb. 8, 1965 5 Sheets-Sheet 5

INVENTORS
JOHN LESTER DENLINGER
THOMAS E. SMITH

BY Stephen L. Husting
ATTORNEY

United States Patent Office 3,318,137
Patented May 9, 1967

3,318,137
ROTARY INSPECTION APPARATUS
John Lester Denlinger and Thomas E. Smith, both of Lancaster County, Pa., assignors to Armstrong Cork Company, Lancaster, Pa., a corporation of Pennsylvania
Filed Feb. 8, 1965, Ser. No. 430,887
12 Claims. (Cl. 73—45.3)

This invention relates to rotary inspection apparatus and more particularly to an inspection machine having a plurality of inspection heads mounted for rotation about a central axis.

In co-pending applications Ser. No. 431,055 and Ser. No. 431,056 there are disclosed novel inspection heads which are valveless in nature and have feeler gauge means for inspecting articles such as sealing rings or liners in closures, for example. A spring biased sleeve surrounds each of the above-noted inspection heads and cooperates therewith to remove closures having defective sealing rings from an inspection position with respect to a particular inspection head. If, however, the particular closure being tested has an acceptable sealing liner or ring therein, the sleeve will not remove that closure from the inspection head. Such acceptable closures will remain in position with regard to the inspection head due to a retention force created by an evacuated area interiorly of the closure.

In the above-noted applications, a single test head device was disclosed. However, in the closure manufacturing industry, high speed manufacturing and handling equipment are required. Thus, it became necessary to develop high speed inspection apparatus which could utilize the concepts and apparatus disclosed in the above-noted applications.

An object of the present invention is to provide inspection apparatus.

Another object of the present invention is to provide a rotary inspection machine which is capable of sustained, high speed operation.

Another object of the present invention is to provide a rotary inspection machine having high speed infeed means.

Another object of the present invention is to provide a rotary inspection machine having discharge means capable of operation under high speed conditions.

Other objects of the present invention will be readily apparent from the detailed description thereof with reference to the drawings wherein FIGURE 1 is a sectional plan view with portions broken away of a rotary inspection machine according to the present invention;

Figure 1:
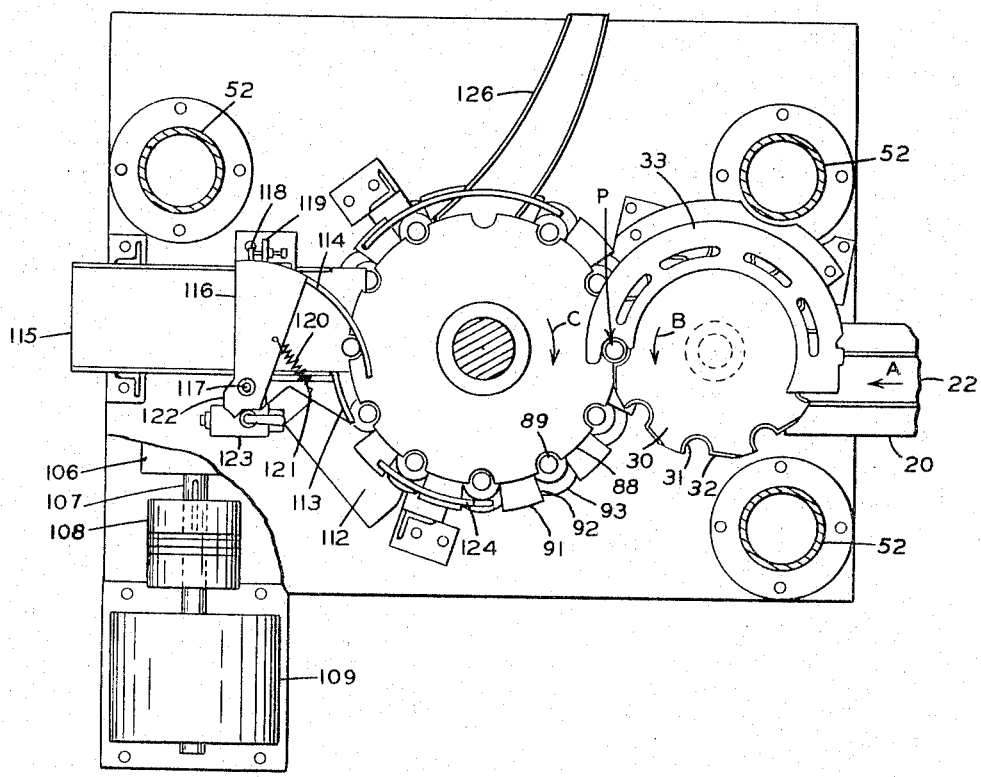
Figure 2:
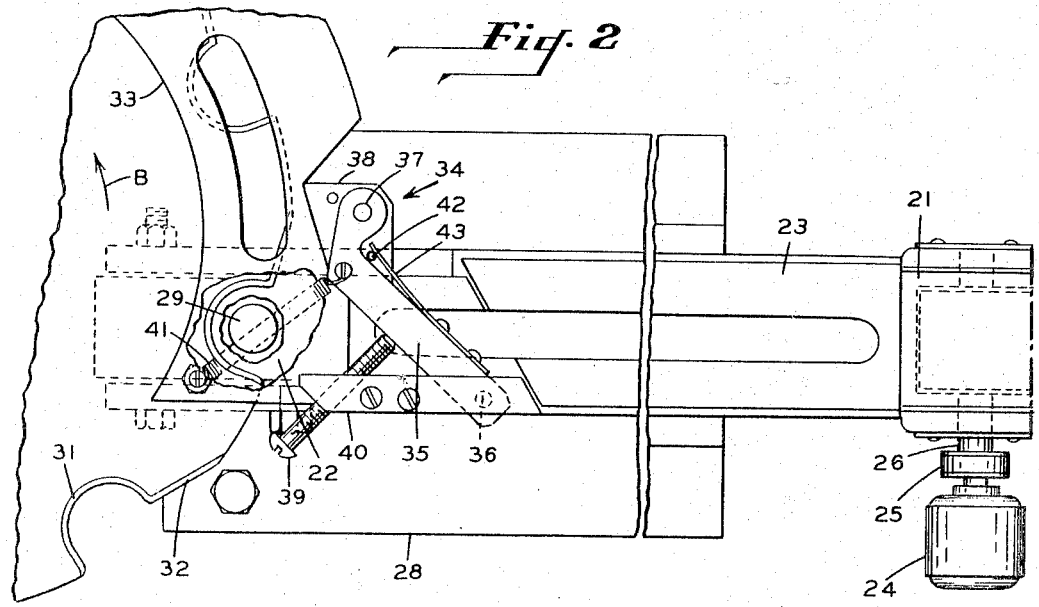
FIGURE 2 is an enlarged plan view with portions broken away of a portion of the infeed mechanism of a rotary machine according to the present invention.
Figure 3:
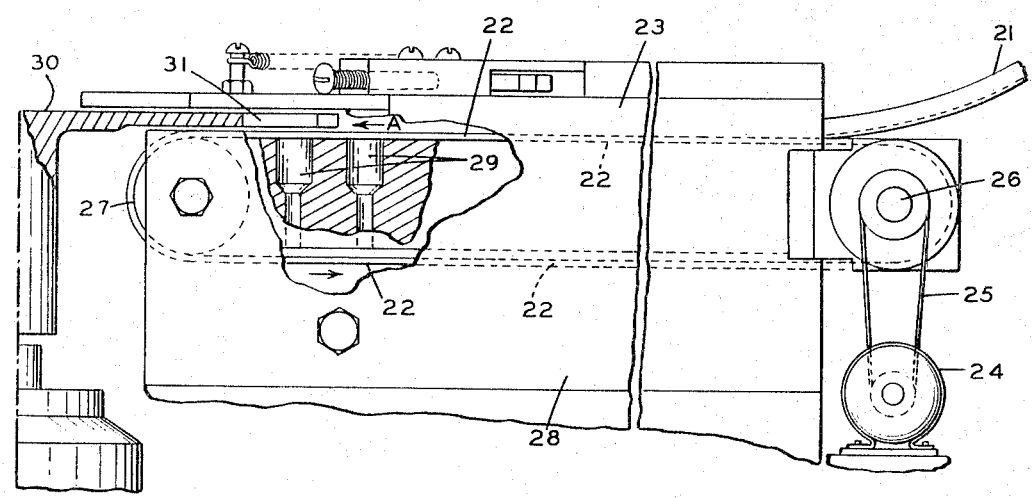
FIGURE 3 is a view in elevation with portions broken away of the apparatus shown in FIGURE 2.

Referring to FIGURES 1 to 3, there is shown an infeed mechanism 20. Articles such as closures, for example, may be supplied to infeed mechanism 20 by means of chute 21 which is connected to a suitable supply hopper as is well known in the art. Chute 21 maintains the closure passing therethrough in single layer and file relationship. The chute 21 discharges closures onto the end of conveyor belt 22 which moves the closures through guide housing 23 in the direction indicated by arrow A. Guide housing 23 surrounds the top and sides of conveyor belt 22 in such a manner as to maintain the closures passing through said housing in an aligned, single layer fashion. Belt 22 is driven by a conventional variable speed motor 24, drive means 25, and drive pulley 26. Belt 22 is supported at its left-hand end as viewed in FIGURE 3 by means of idler pulley 27. The elements of the infeed mechanism 20 are mounted on support table 28.

A pair of magnets 29 are located in a stationary position underlying belt 22 adjacent idler pulley 27. Magnets 29 serve to maintain metallic closures in frictional contact with belt 22 at this point.

Transfer wheel 30 has a peripheral portion which overlies belt 22, idler pulley 27, and one of the magnets 29. Transfer wheel 30 has a plurality of peripherally spaced, closure-receiving recesses 31 each of which has a configuration which will support a closure. The leading edge 32 of each recess 31 is cut back. Thus, when transfer wheel 30 is rotated in a direction indicated by arrow B, each recess 31 and its associated leading edge 32 pass over belt 22 in adjacent relationship therewith. If belt 22 has moved a closure adjacent transfer wheel 30, as soon as leading edge 32 starts to pass said closure, the closure will be urged into contact therewith by the continuous movement of belt 22 in direction A. It is apparent that successive rotation of transfer wheel 30 will eventually align the recess associated with this cut back leading edge 32 with the discharge end of the belt whereupon the closure which had been urged into contact with the leading edge 32 will be deposited in the recess 31 to be carried thereby off belt 22. The cut back leading edge 32 allows closures to be fed to recesses 31 at a higher rate as a result of the guiding action of said leading edge 32 with respect to its associated recess 31. This guiding action allows the closure being guided an additional amount of time in which to orient itself with respect to a particular recess 31. It should be noted that the magnet 29 closest to idler wheel 27 directly underlies each recess 31 as it passes over belt 22, and the action of this magnet 29 serves to draw a closure to belt 22 which in turn increases friction so belt 22 can more positively seat the article in recess 31. The action of magnet 29, belt 22, and cut back leading edge 32 provide for substantially jam-free operation.

A stationary guide housing 33 overlies transfer wheel 30 at the point where it passes over belt 22. Guide housing 33 has a perforate upper portion for visual inspection purposes. As mentioned above, infeed mechanism 20 and transfer wheel 30 are designed to prevent jamming of closures in the area where they are transferred from belt 22 to transfer wheel 30. However, should a closure become jammed at this point, a release mechanism 34 is provided. An arm 35 is pivoted about point 36 and overlies guide housing 23. The free end of arm 35 is provided with a depending pin 37. A release block 38 is pivotally supported by pin 37. An adjustable stop screw 39 is mounted in support 40 and extends into the path of movement of arm 35. A spring 41 is connected at one end to stationary guide housing 33 and at its opposite end to arm 35 near its free end. Spring 41 biases arm 35 into engagement with stop screw 39. The outer side of guide housing 33 is provided with an escape opening located at the point where jamming is most likely to occur and that is closely adjacent the downstream side of the point of transfer of the closure from the belt 22 to wheel 30. This escape opening is sufficiently large to allow a closure to pass therethrough and has a configuration to receive block 38 so that said block 38 normally closes said escape opening and is located adjacent to but spaced from the periphery of wheel 30. Release block 38 has an upwardly extending pin 42 which is resiliently held adjacent one side of arm 35 by spring blade 43 which is secured to arm 35. Thus, if a closure should become jammed at the point of transfer between belt 22 and transfer wheel 30, rotational movement of transfer wheel 30 will impel the jammed closure against release block 38 whereupon said block 38 and arm 35 will be moved in a clockwise direction against the bias of spring 41 to allow the jammed closure to be released from transfer wheel 30 and guide housing 33. Once the jammed closure has been freed from the apparatus, arm 35 and block 38 will return to the position shown in FIGURE 2 under the influence of spring 41. The pivotal mounting of block 38 with respect to arm 35 provides an additional aid in releasing jammed closures.

Figure 4:
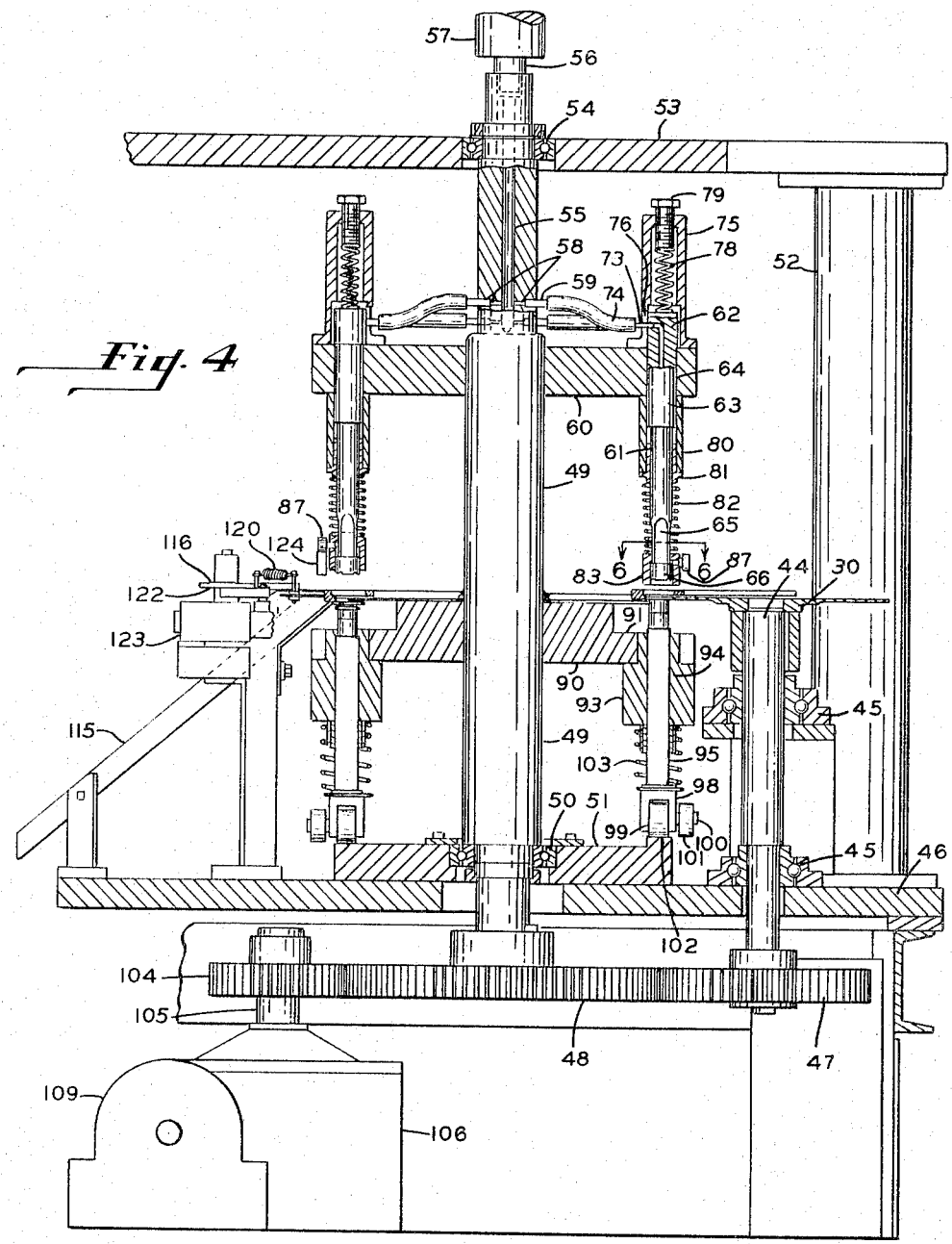
FIGURE 4 is a sectional view in elevation with portions broken away of a rotary inspection machine according to the present invention.
Figure 5:
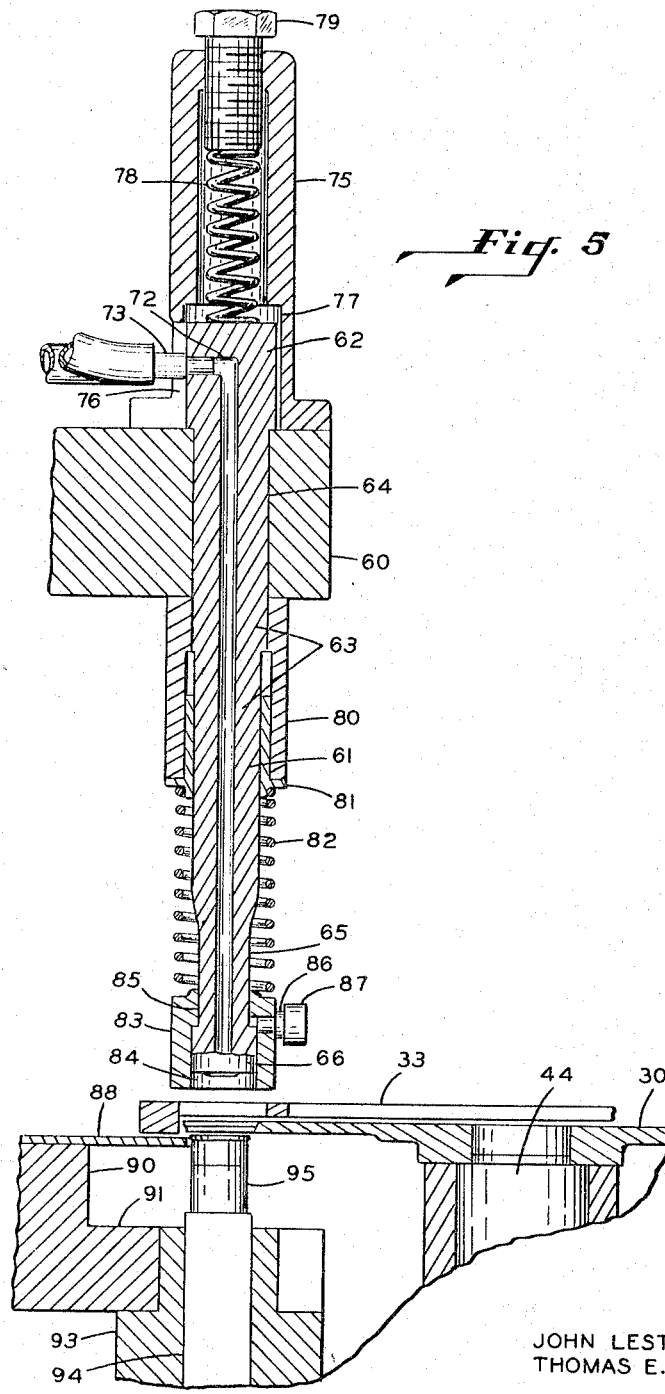
FIGURE 5 is an enlarged sectional view in elevation with portions broken away of an inspection head and associated components incorporated in a machine according to the present invention.
Figure 6:
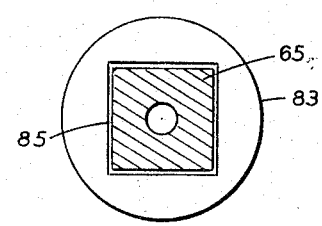
FIGURE 6 is an enlarged sectional view of an inspection head shown in FIGURE 4 and taken along line 6—6 therein.

Refering now to FIGURES 1, 4, and 5, transfer wheel 30 is secured to vertical shaft 44 which is mounted for rotation in bearings 45. Bearings 45 are mounted on support table 46 and suitable support structure associated therewith. Shaft 44 extends downwardly through support table 46. A gear 47 is located adjacent the lower end of shaft 44. Gear 47 meshes with gear 48 which is secured adjacent the lower end of shaft 49. Shaft 49 extends upwardly through table 46 and is supported for rotation by bearing 50 which is mounted in cam plate 51, said cam plate 51 being secured to the upper surface of support table 46. A plurality of support columns 52 extend upwardly from support table 46. A horizontal plate 53 is supported by columns 52 at their upper ends. Shaft 49 extends through plate 53 and is supported for rotation with respect thereto by means of bearing 54 which is mounted in plate 53.

The upper portion of shaft 49 is provided with a central passage 55 which extends upwardly to the upper end of said shaft 49. A conventional rotary joint 56 is provided at the upper end of shaft 49 to communicate passage 55 with conduit 57 which leads to a suitable low pressure or vacuum source. Shaft 49 has a plurality of radial passages 58 which communicate with central passage 55. A plurality of radial nipples 59 are secured to shaft 49 and communicate with radial passages 58.

A transverse plate 60 extends outwardly from shaft 49 and is secured to said shaft 49 for rotation therewith. A plurality of circumferentially spaced, vertical inspection head assemblies 61 extend through plate 60. Each inspection head has an upper portion 62 of a given diameter or lateral extent. An intermediate body portion 63 depends from upper portion 60 and extends through bore 64 in plate 62. Intermediate body portion 63 has a diameter or lateral extent which is reduced with respect to upper body portion 62 thereby forming a step or flange at the juncture between these elements. Bore 64 is of a lesser lateral extent than upper portion 62, and the upper surface of plate 60 cooperates with the step or flange at the bottom of upper portion 62 to form a lower limit with regard to downward movement of inspection head assembly 61. Inspection head assembly 61 has a rectangular guide portion 65 depending from intermediate body portion 63. Lower body portion 66 depends from guide portion 65. The lower end of lower body portion 66 comprises the article or closure-receiving portion and may have a configuration similar to that disclosed in application Ser. No. 431,055 or Ser. No. 431,056.

Figure 7:
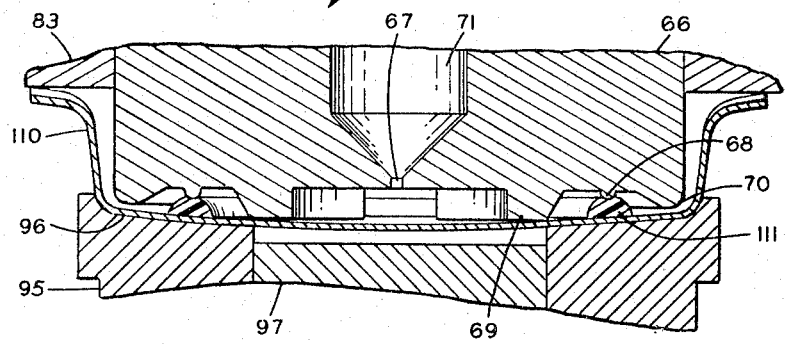
FIGURE 7 is an enlarged, sectional view in elevation of an inspection head, a closure being inspected, and chuck which may be used on a rotary machine according to the present invention.
Figure 8:
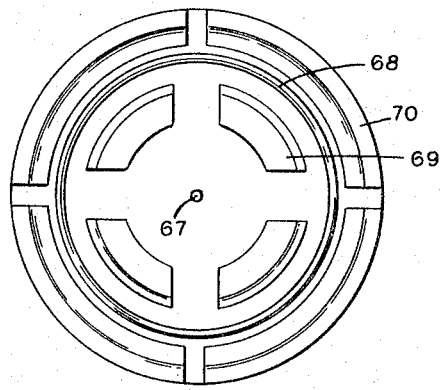
FIGURE 8 is a bottom view of an inspection head which may be used on a machine according to the present invention.

Should the configuration of the inspection head disclosed in application Ser. No. 431,055 be utilized, the article-receiving portion on the lower body portion 66 will be provided with an orifice 67 as shown in FIGURES 7 and 8. A rigid, annular inspection gauge ring 68 surrounds orifice 67 in spaced relationship. A plurality of circumferentially spaced, arcuate, feeler segments 69 surround orifice 67 between said orifice 67 and the inspection ring 68. A similar set of circumferentially spaced, arcuate, feeler segments 70 are located outwardly of the inspection ring 68. A passage 71 communicates with orifice 67 and extends upwardly through inspection head 61. A lateral passage 72 communicates the upper portion of passage 71 with nipple 73. A flexible conduit 74 connects nipples 73 and 59.

Upper portion 62 of inspection head assembly 61 is surrounded by housing 75 which has a vertical slot 76 through which nipple 73 extends. Nipple 73 is free to move in a vertical direction in slot 76. Housing 75 has a lower bore 77 which will allow a limited upward movement of inspection head assembly 61. A spring 78 is located within housing 75 above upper portion 62. A threaded plug 79 extends downwardly through the upper portion of housing 75 into contact with the upper portion of spring 78. The effect of spring 78 on inspection head assembly 61 may be varied by adjustment of plug 79.

An annular guide 80 depends from plate 60 in surrounding relationship to intermediate body portion 63. Guide 80 may be provided with a stationary key which cooperates with a suitable keyway in intermediate body portion 63 to prevent rotation thereof. A sleeve-like collar 81 is threadedly received in the lower portion of guide 80 in surrounding relationship to intermediate body portion 63. A spring 82 extends downwardly from collar 81 in surrounding relationship to inspection head 61. The lower end of spring 82 rests on an upper surface of a sleeve 83 which surrounds lower body portion 66 and a portion of guide 65. Sleeve 83 has a bore 84 extending upwardly from the lower portion thereof which surrounds lower body portion 66. A rectangular bore 85 extends downwardly from the upper surface of sleeve 83 into communication with bore 84. The lateral extent of bore 84 is more than that of bore 85 thereby forming a flange at the juncture between said bores which cooperates with a shoulder formed by the juncture of guide 65 and lower body portion 66 to provide a lower limit for movement of sleeve 83 with respect to lower body portion 66. Spring 82 biases sleeve 83 into its lowermost position but will allow upward movement thereagainst. Sleeve 83 is provided with an outwardly extending shaft 86 on which cam roller 87 is rotatably mounted. The rectangular cross section of guide 65 and bore 85 prevents rotational movement of sleeve 83 with respect to inspection head assembly 61.

A transverse plate 88 is secured to shaft 49 and extends outwardly therefrom in closely spaced relationship to the lower portion of transfer wheel 30. Plate 88 has a plurality of circumferentially spaced, closure-receiving recesses 89 in the periphery thereof. Each of the closure-receiving recesses 89 underlies and is aligned with the lower body portion 66 of an inspection head assembly 61. Shafts 49 and 44 are spaced such that a peripheral portion of transfer wheel 30 overlies a portion of plate 88. The maximum amount of overlay occurs at point P, and transfer wheel 30 and plate 88 are positioned such that one of the recesses 31 in transfer wheel 30 will be axially aligned with one of the recesses 89 in plate 88 and its associated inspection head assembly 61 each time these elements are located at point P.

Underlying plate 88 is support plate 90 having a radially extending flange 91 located in spaced relationship below plate 88. Flange 91 has a plurality of peripherally spaced recesses 92, each of which is aligned with an inspection head assembly 61 and its associated recess 89. A downwardly extending guide member 93 is located in each of the recesses 92 in secured relationship with flange 91. Each guide member 93 has an axial bore 94 which reciprocatingly receives a chuck 95. The upper end of chuck 95 is provided with a closure-receiving cavity 96 which serves to properly position a closure to be inspected with respect to the inspection head assembly 61. If desired, chuck 95 may have a magnetic insert 97 to aid in holding a closure to be inspected in proper position, as shown in FIGURE 7. Chuck 95 extends above and below guide member 93. Chuck 95 has a lower, bifurcated end 98 which receives cam roller 99 and shaft 100 about which cam roller 99 is rotatably supported. Shaft 100 extends outwardly of bifurcated end 98 and has cam roller 101 rotatingly supported thereon. The outer periphery of plate 51 is provided with an upwardly facing cam surface 102 which cooperates with cam roller 99 to move chuck 95 in a vertical direction. A spring 103 surrounds chuck 95 between guide member 93 and bifurcated end 98 to bias cam roller 99 into contact with cam surface 102. Chuck 95 and bore 94 may have cooperating rectangular cross sections to prevent rotational movement therebetween. It is to be understood, however, that other means such as splines or keyways may be used to perform this same function.

Gear 48 meshes with gear 104 which is secured to output shaft 105 of gear unit 106. The input shaft 107 of gear unit 106 is connected through conventional coupling means 108 to variable speed drive motor 109.

As mentioned above in the first portion of the specification, closures to be inspected are supplied by the infeed mechanism 20 to transfer wheel 30 which receives said closures in recesses 31. Transfer wheel 30 is rotated in the direction indicated by arrow B, which moves each closure to be inspected toward point P. It is to be understood that during normal operation of the machine, transfer wheel 30 and rotary shaft 49 are continuously rotating. As a particular closure 110 to be inspected which is carried by a recess 31 in wheel 30 approaches point P, cam surface 102 acts on cam roller 99 to raise chuck 95 against the bias of spring 103. As a particular chuck 95 approaches point P it is raised in this manner until the upper portion of chuck 95 passes through its corresponding recess 89 in plate 88 and directly underlies the closure 110 to be inspected at point P in contacting relationship therewith. The seating arrangement of the closure 110 in chuck cavity 96 is shown in FIGURE 7.

Upon further rotation of transfer wheel 30 and plate 88 past point P, the closure 110 to be inspected which is now seated in chuck cavity 96 is withdrawn from its previous seat in recess 31. The lateral extent of the upper portion of chuck 95 is less than that of recess 31 thereby allowing chuck 95 to pass upwardly therethrough in response to the continued rise of cam 102. Chuck 95 continues to be raised by cam surface 102 until the periphery of the closure 110 has contacted the lower surface of sleeve 83, whereupon further upward movement of chuck 95 will cause sleeve 83 to be raised against the bias of spring 82 until the sealing ring 111 in closure 110 is located in inspection position with regard to head assembly 61, as shown in FIGURE 7. In the example shown in FIGURE 7, a proper seating arrangement has been made between sealing ring 111 and inspection ring 68. It is to be noted that the upper surface of sealing ring 111 is slightly deformed as it is pressed against rigid inspection ring 68. This seating arrangement is accomplished by raising chuck 95 to a point such that inspection head assembly 61 is slightly raised against the bias of spring 78.

It is to be noted that the low pressure or vacuum is continually maintained in central passage 71. Thus, when no closure is in inspection position there will be air flow through orifice 67. However, if a closure 110 has a sealing ring 111 which properly seats with respect to inspection ring 68 such that there is little or no appreciable air flow from the exterior of sealing ring to the interior thereof and subsequently through orifice 67, a pressure differential will be created between the interior and the exterior of the closure 110 which acts on said closure 110 with a component of force tending to retain said closure 110 in contact with the inspection head assembly 61. When there is little or no air leakage through the sealing ring 111, the closure 110 will be retained on the inspection head assembly 61 even after chuck 95 is withdrawn therefrom. The spring 82 acting on sleeve 83 is chosen and collar 81 is adjusted so that said spring 82 will apply a force through sleeve 83 against the periphery of closure 110 tending to strip that closure 110 from the inspection head, and this stripping force will be less than the maximum retention force tending to maintain the closure in contact with the inspection head under conditions of little or no air leakage through sealing ring 111.

It may be determined experimentally how much leakage may be allowed through sealing ring 111 when it is in inspection position with respect to inspection head 61 before a particular sealing ring 111 will not make an acceptable seal with respect to the container to which it is applied. Closures having liners which will not make an acceptable seal with the containers to which they are applied must be rejected and segregated from those closures which have sealing rings which will provide an acceptable seal. It has been found that a sealing liner may have minor defects or flaws in the surface or other portions thereof which will not affect its sealing performance when it is applied to a container. The effect or force of spring 82 as applied through sleeve 83 to the periphery of closure 110 may be adjusted by means of collar 81 as stated above so that said force will be greater than the retention force acting on a closure having a sealing liner which is unacceptable in that it will not provide adequate sealing action when it is applied to a container. It is to be understood that the pressure differential and the resultant retention force acting on a closure having a defective or unacceptable sealing liner will be less than the pressure differential and resultant retention force acting on a closure having minor or no defects. It is to be noted that the inertial forces of the rotary machine must be taken into account in determining the proper stripping force which is to be applied to the closures being inspected.

Chuck 95 remains in its uppermost position during rotation of shaft 49 to a point which is approximately 118° from point P, at which time cam surface 102 starts to descend. At the same point, there is provided a safety cam surface 112 which overlies cam roller 101 and engages the surface thereof to exert a positive, downward force on chuck 95 should said chuck 95 not follow the descent of cam 102. As is apparent from FIGURE 9, cam surfaces 102 and 112 are complementary during the descent of chuck 95 until chuck 95 is at its lowermost position, at which time cam surface 112 terminates. As chuck 95 descends, the closure 110 which had previously been in inspection position with respect to head 61 will remain in that position if it contains an acceptable sealing liner 111 in accordance with the operation noted above. In such a case chuck 95 separates from closure 110 during its descent. However, if the closure 110 being tested has a sealing ring which has defects of a nature which will prevent adequate sealing between it and the container to which it is to be applied, sleeve 83 will strip the closure from the inspection head as chuck 95 descends, and the defective closure will descend with chuck 95 as plate 88 continues to rotate. When chuck 95 passes downwardly through recess 89 in plate 88, the edges of the rejected closure will engage the edges of the recess 89 on one side and the edge of stationary guide shoulder 113 on the other side. Upon further downward movement of chuck 95, the defective closure will be stripped from chuck cavity 96. Plate 88 continues to rotate with the rejected closure 110 supported in its associated recess 89 and by guide shoulder 113 until the rejected closure is engaged by the cam surface of finger 114 whereupon further rotation of plate 88 will cause the rejected closure to be cammed out of recess 89 into discharge chute 115 which may lead to a suitable collector for rejected closures.

Finger 114 is arcuate in shape and depends from support plate 116 which is pivoted about point 117. A stop lug 118 is secured to finger 114. Adjustable stop 119 is located in the path of lug 118 to limit clockwise movement of finger 114 about point 117. Lug 118 is biased against stop 119 by means of spring 120 which is secured to plate 116 and stationary support 121. Plate 116 has a cam portion 122 adjacent pivot point 117 which actuates switch 123 if there is pivoting movement of finger 114 about pivot point 117 in response to a jamming condition of closures with respect thereto. Switch 123 when actuated will terminate operation of the machine until the jammed condition is corrected. It should be noted that the stationary guide plate 113 is located adjacent plate 88 to prevent any closures carried thereby from being prematurely discharged from their respective recesses 89 by centrifugal force after said closures have been disengaged from their respective chucks but prior to being engaged by finger 114.

Figure 9:
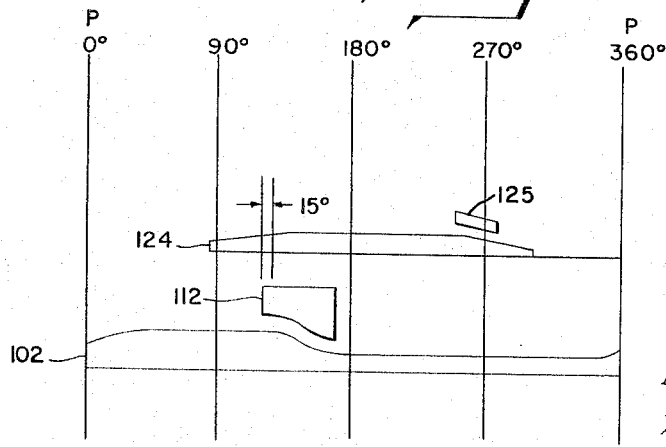
FIGURE 9 is a diagram showing relationship between various cam surfaces of the rotary inspection machine.

About 15° after chuck 95 begins its descent, the up-slope of cam 124 engages roller 87 and lifts said roller 87 and sleeve 83 out of contact with the periphery of the closure being inspected. The actual inspection of a particular closure occurs during the latter portion of this 15° period of rotation, and it is during this time that the sleeve 83 exerts its stripping influence on the closure adjacent the inspection head assembly to reject said closure if it is defective. As stated above, if a closure is found to be acceptable it will remain on the inspection head assembly. The sleeve 83 remains raised during a predetermined amount of rotation after the inspection period. Without cam 124 it was found that a few closures were falsely rejected subsequent to the 15° period noted above. Although the reasons for such false rejections are not fully understood, cam 124 solved this problem. As shown in FIGURE 9, cam 124 holds roller 87 in a raised position to a point approximately 255° from point P. Thereafter, cam 124 descends allowing sleeve 83 to contact a closure which has remained on the inspection head. At a point approximately 241° from point P a cam 125 overlies cam roller 87 and slopes downwardly to contact said cam roller 87 upon further rotation of sleeve 83. Cam 125 continues to slope in a downward direction thereby causing cam follower 87 to move sleeve 83 in a downward direction with respect to lower body portion 66. Cam 125 causes sleeve 83 to be moved adjacent its lowermost position at which point the lower surface of sleeve 83 is below the lowermost portion of inspection head assembly 61. This downward movement of sleeve 83 causes a closure which has been adhered to the inspection head up to this point and therefore, deemed to be acceptable, to be stripped from lower body portion 66 into discharge chute 126.

Subsequent rotation of the inspection head about the axis of shaft 49 returns it to point P in preparation for another inspection cycle.

In the discussion noted above, an inspection head having a rigid inspection ring similar to that disclosed in application Serial No. 431,055 has been used as an example. However, the inspection heads of the rotary machine disclosed in this application may have a resilient inspection ring and associated feeler means similar to that disclosed in application Ser. No. 431,056. Regardless of which type of inspection ring is utilized, the rotary machine will perform in the manner similar to that described above. If inspection heads having resilient inspection rings are used, it has been found that cam 124 is not required and may be omitted. The resilient inspection rings apparently absorb inertial shocks and vibrations which might otherwise cause acceptable closures to be stripped from the inspection heads by spring biased sleeves 83.

It is to be understood that the particular mechanisms shown and described may be varied. For example, the cam rollers associated with the sleeves may be replaced by a cam-like collar which cooperates with stationary cam rollers to be substituted for cam 125. Similarly, splines or keys may be substituted for the rectangular cross sections of the reciprocating parts to prevent twisting thereof.

Thus, it is apparent that the device of the present invention provides for accurate, high speed inspection of sealing material and articles. Further, the device of the present invention provides operable apparatus which is economical to operate and maintain. It should be noted that the shape and size of the inspection ring and feeder means depend upon the size and shape of the sealing ring, closure, or other article to be inspected. The apparatus of the present invention may be used to inspect defects in many types of sealing means and is not limited to inspecting sealing rings in closures or a particular type of sealing ring in a particular type of closure. Similarly, the inspection apparatus of the present invention may be used to inspect sealing rings of many different types of materials and is not limited to the inspection of those materials described herein. It is to be understood that all elements including the inspection heads may be sectionalized and secured together with conventional fastening means for assembly purposes as would be obvious to a skilled mechanic or machinist. Further, the shapes, sizes, number, relative location, and materials of construction of the elements disclosed herein may be varied, and the present invention is not limited to the specific embodiment shown and described herein. For example, the number of arcuate segments and positioning thereof as well as the spaces therebetween on the inspection head may be varied and staggered without departing from the scope of the invention.

Various modifications of the present invention will occur to those skilled in the art without departing from the spirit and scope thereof as defined in the claims.

We claim:

1. Inspection apparatus comprising rotary support means, at least one inspection head means supported by said rotary support means, said head means including body means, said body means having at least one article-receiving portion for receiving an article to be inspected, sleeve means surrounding said body means, bias means associated with said sleeve means, follower means on said sleeve means, cam means to actuate said follower means on said sleeve means, article support means supported below said head means by said rotary support means, means to supply at least one article to be inspected to said article support means, means to rotate said rotary support means about a given axis, said rotary support means supporting said article support means and said head means co-axially and parallel to but spaced from said given axis for rotation thereabout, means to move said article support means toward said head means to position said article in an inspection position with respect to said head means, means to apply a reduced pressure in an area between said head means and said article to be inspected, means to move said support means away from said head means, said rotary support means including means to receive rejected articles from said head means and said article support means, means to discharge a rejected article from said receiving means, and means to discharge an acceptable article.

2. Inspection apparatus according to claim 1 further comprising means to resiliently support said head means on said rotary support means.

3. Inspection apparatus according to claim 2 wherein said rejected article-receiving means include plate means substantially normal to said given axis and having spaced, peripheral notches therearound.

4. Inspection apparatus according to claim 3 including a plurality of inspection head means and associated article support means circumferentially spaced with respect to said given axis, each head means and associated article support means being aligned with one of the notches of said plate means.

5. Inspection apparatus according to claim 4 wherein said means to move said article support means toward said head means include follower means on said article support means and cam means which cooperate with said follower means on said article support means and wherein said means to move said article support means away from said head means include cam means which cooperate with said follower means on said article support means.

6. Inspection apparatus according to claim 5 wherein said article support means include chuck means having magnetic inserts.

7. Inspection apparatus according to claim 6 further comprising bias means for said article support means which tend to move said article support means away from said head means.

8. Inspection apparatus according to claim 7 wherein said means for discharging said rejected articles include finger means and chute means cooperating with said finger means to receive rejected articles from said plate means.

9. Inspection apparatus according to claim 8 wherein said inspection head means are valveless.

10. Inspection apparatus according to claim 1 wherein said means to supply an article to be tested include a transfer wheel having at least one article-receiving recess therein, said recess having a cut back leading edge, and means to supply at least one article to be tested to said recess.

11. Inspection apparatus according to claim 1 wherein said means to discharge rejected article include finger means located in the path of movement of said rejected article, said finger means operating to cam a rejected article away from said rejected article-receiving means.

12. Inspection apparatus comprising rotary support means, at least one valveless inspection head means supported by said rotary support means, said head means including body means, said body means having at least one article-receiving portion for receiving an article to be inspected, sleeve means surrounding said body means, bias means associated with said sleeve means, follower means on said sleeve means, cam means to actuate said follower means on said sleeve means, article support means supported below said head means by said rotary support means, means to supply at least one article to be inspected to said article support means, means to rotate said rotary support means about a given axis, said rotary support means supporting said article support means and said head means co-axially and parallel to but spaced from said given axis for rotation thereabout, means to move said article support means toward said head means to position said article in an inspection position with respect to said head means, means to apply a reduced pressure in an area between said head means and said article to be inspected, means to move said support means away from said head means, said rotary support means including means to receive rejected articles from said head means and said article support means, means to discharge a rejected article from said receiving means, and means to discharge an acceptable article.

References Cited by the Examiner

UNITED STATES PATENTS

| | | | |
|---|---|---|---|
| 1,531,081 | 3/1925 | Dondero et al. | |
| 2,112,536 | 3/1938 | Krueger | 209—72 X |
| 2,696,107 | 12/1954 | Blaing-Leisk | 209—72 X |
| 2,924,093 | 2/1960 | Hurst | 209—74 X |
| 3,015,388 | 1/1962 | Wilckens | 209—75 |
| 3,018,886 | 1/1962 | Matejek | 209—72 |

References Cited by the Applicant

UNITED STATES PATENTS

| | | |
|---|---|---|
| 1,606,486 | 11/1926 | Stevens. |
| 1,825,700 | 10/1931 | Landrum. |
| 2,106,407 | 1/1938 | Hensley. |
| 2,399,391 | 4/1946 | Russell. |
| 2,432,871 | 12/1947 | Fedorchak et al. |
| 2,881,475 | 4/1959 | Wilckens. |
| 2,954,585 | 10/1960 | Simpson. |
| 3,015,388 | 1/1962 | Wilckens. |

SAMUEL F. COLEMAN, *Primary Examiner*.